F. PRESTWICH.
COTTON PICKING MACHINE.
APPLICATION FILED MAY 18, 1907.

959,603.

Patented May 31, 1910.
4 SHEETS—SHEET 1.

F. PRESTWICH.
COTTON PICKING MACHINE.
APPLICATION FILED MAY 18, 1907.
959,603.
Patented May 31, 1910.
4 SHEETS—SHEET 2.
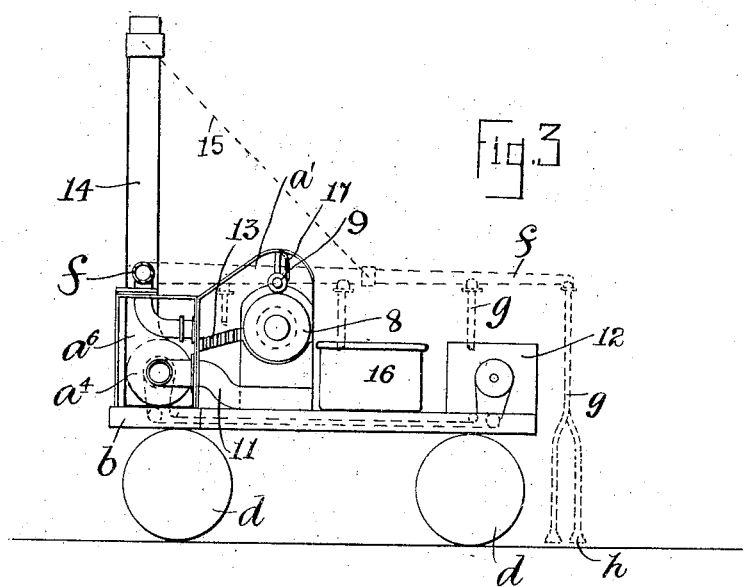
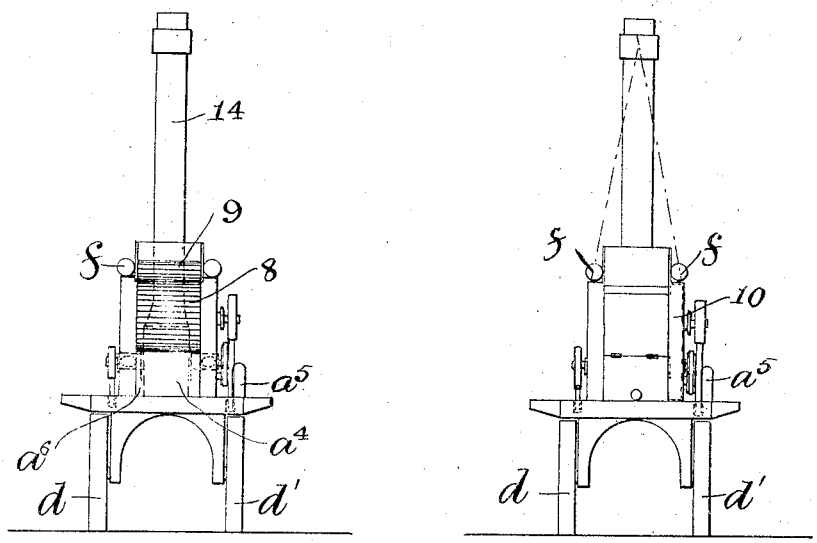

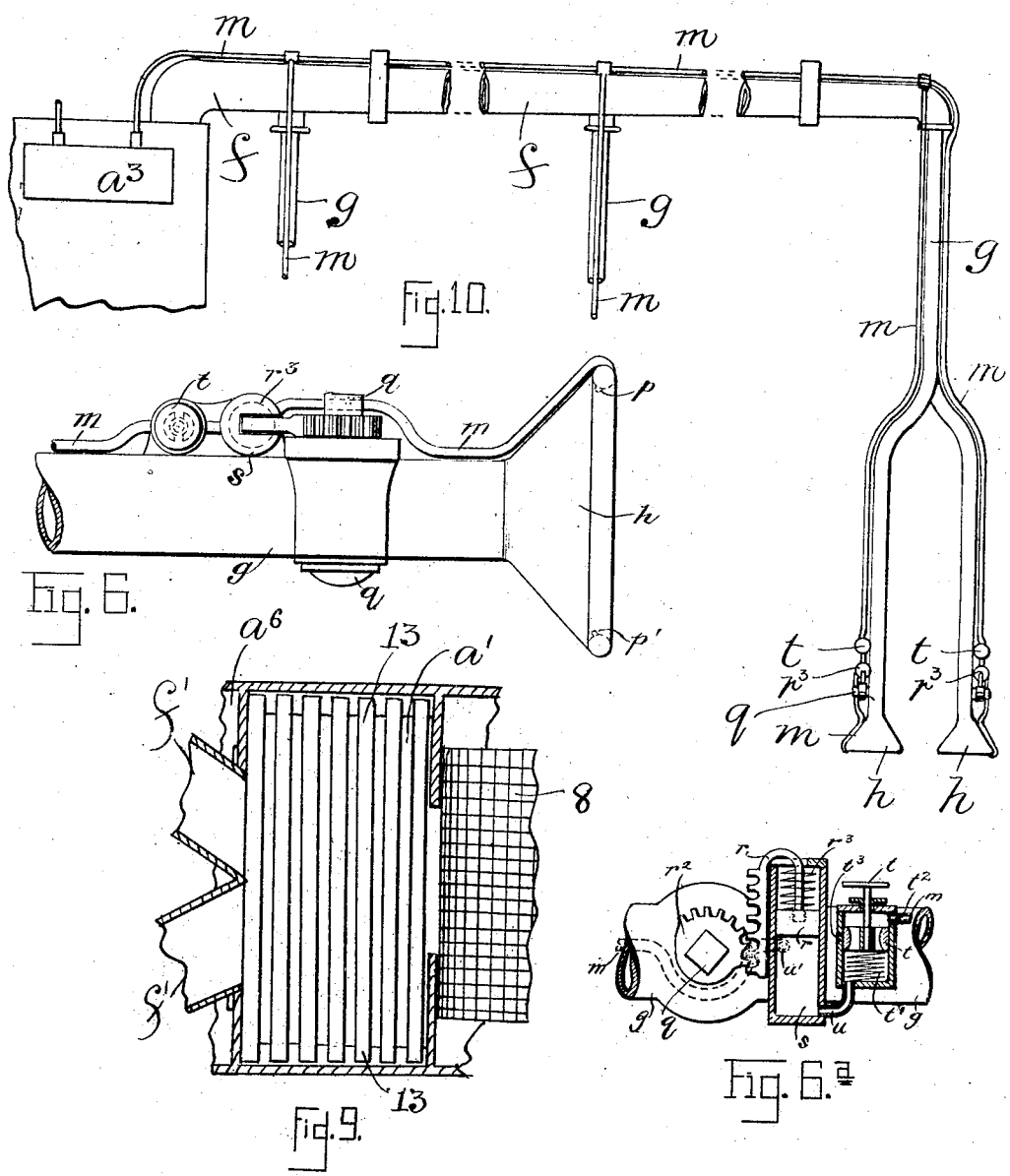

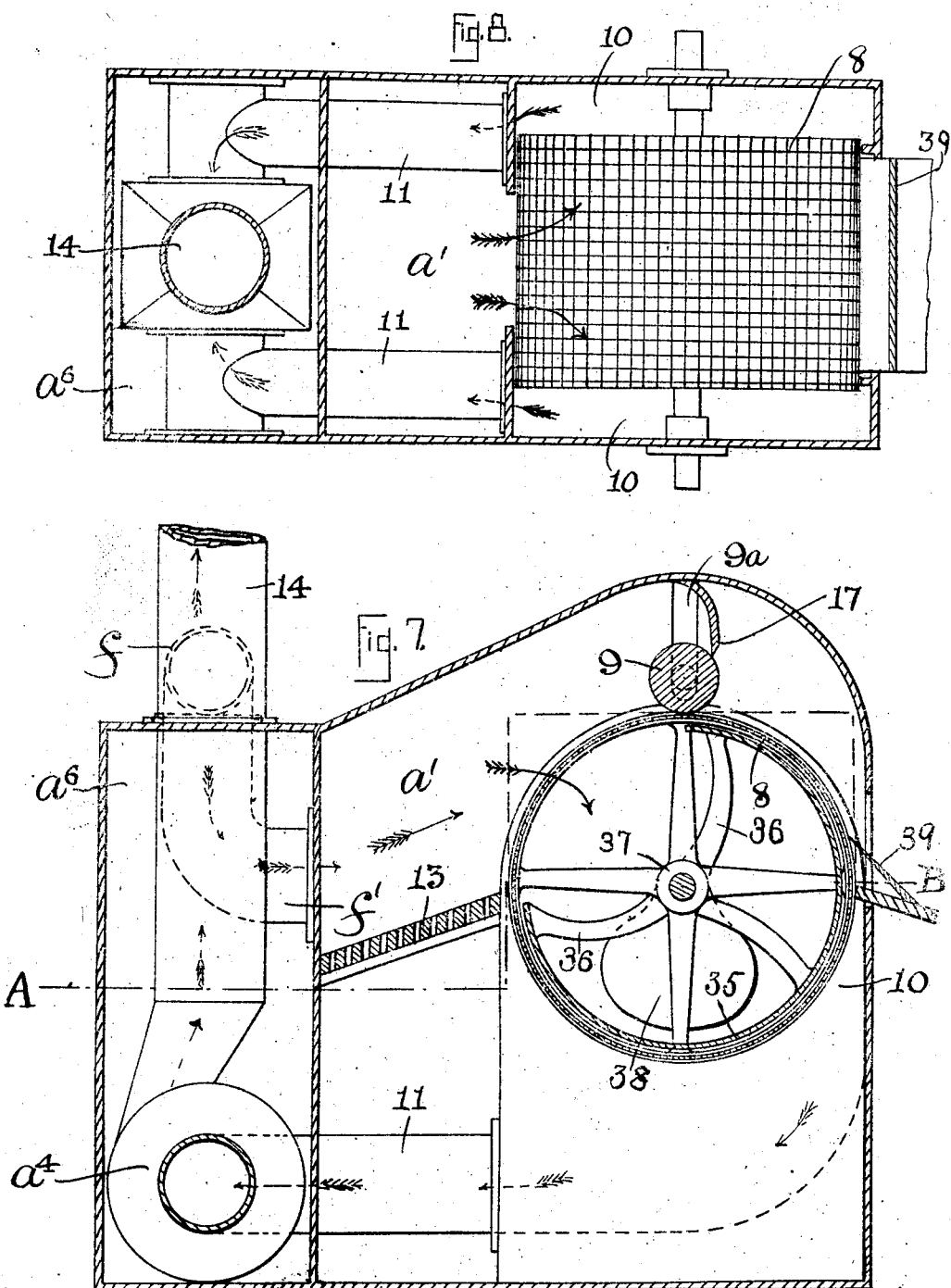

UNITED STATES PATENT OFFICE.

FREDERIC PRESTWICH, OF BOLTON, ENGLAND.

COTTON-PICKING MACHINE.

959,603.
Specification of Letters Patent.
Patented May 31, 1910.

Application filed May 18, 1907. Serial No. 374,477.

*To all whom it may concern:*

Be it known that I, FREDERIC PRESTWICH, a subject of the King of Great Britain, and resident of No. 33 Bradford road, Great Lever, Bolton, in the county of Lancaster, England, have invented a certain new and useful Improvement in Cotton-Picking Machines, of which the following description, together with the accompanying sheets of drawings, is a specification.

This invention relates to that class of cotton picking machines wherein devices are employed which the attendants have to present to the cotton plants to receive or gather the cotton therefrom and convey it by pneumatic action to a common receptacle, and said invention consists in arranging the devices referred to so that several attendants may be enabled to carry out the picking or gathering operations together or simultaneously and in such a manner or by such means as shall deliver said cotton into a receptacle for receiving same with little intermixture of hulls, husks, seed pods or other foreign matter, as this latter is separated from said cotton by the novel devices hereinafter described.

In carrying this invention into effect devices are employed as hereinafter described and as illustrated by the accompanying sheets of drawings, wherein:—

Figure 1:
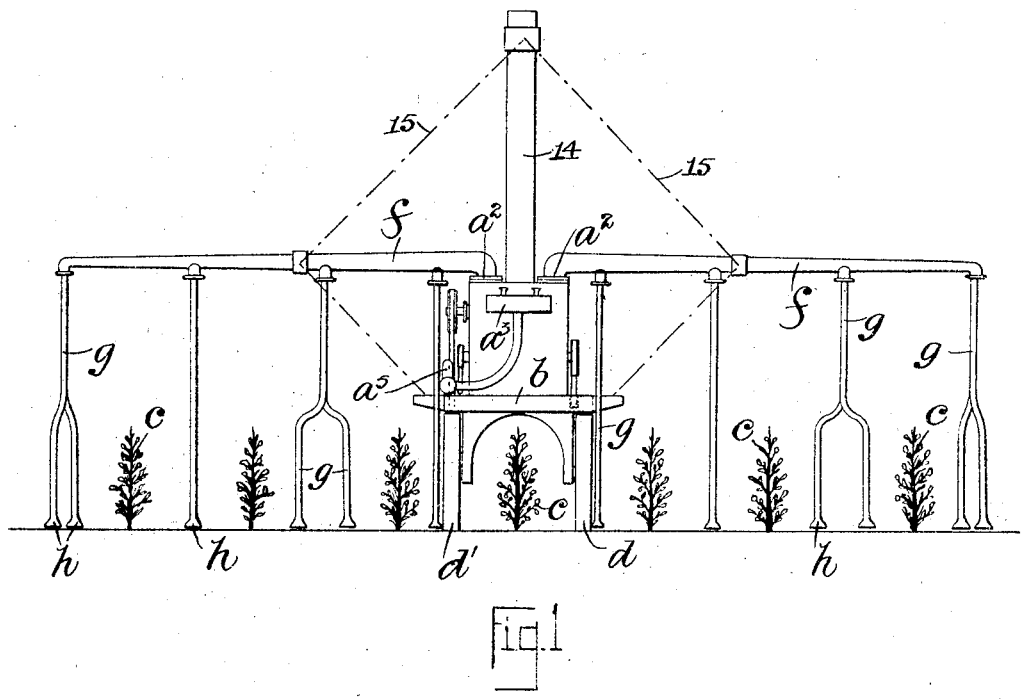
Figure 2:
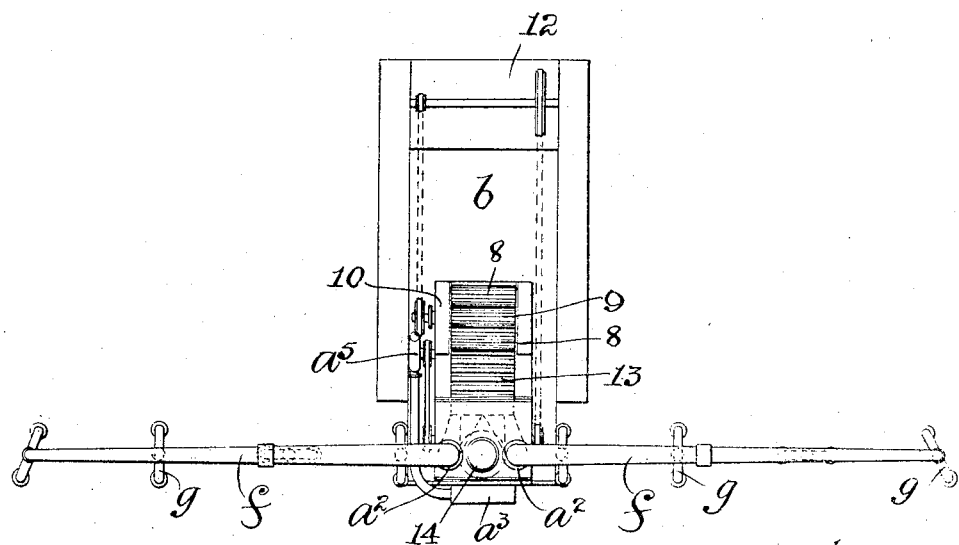

Figure 1 is a front view of the apparatus as when in use for gathering the cotton from several rows of plants. Fig. 2 is a plan of the apparatus shown by Fig. 1. Fig. 3 is a side view of the apparatus shown by Figs. 1 and 2 with certain covers or parts removed, while the folding of other parts is shown in broken lines. Fig. 4 is a rear elevation of the apparatus with certain covering parts removed and with other parts placed in position for enabling the whole to be transported or to travel from one plantation or place to another. Fig. 5 is a similar view to Fig. 4 but shows the parts inclosed by outer covering devices. Fig. 6 is a plan of a part or mouth-piece (drawn to an enlarged scale) constructed as hereinafter explained. Fig. 6$^a$ is a side elevation, partly in section, of a portion of the tube leading to the mouthpiece illustrated by Fig. 6. Fig. 7 is a sectional side elevation, drawn to an enlarged scale, of that part of the apparatus which receives, cleans and delivers or deposits the cotton. Fig. 8 is a sectional plan on line A—B of Fig. 7. Fig. 9 is a plan of the grid or screen 13 and parts in contiguity therewith. Fig. 10 is an enlarged elevation of one of the suction tubes and connections.

Similar letters and figures of reference indicate similar parts throughout the several views.

The vehicle upon which the air propelling mechanism is mounted, is arranged so that its body part $b$ shall be higher than the cotton plants $c$ in order that its wheels $d$, $d'$ may pass between neighboring rows of plants without damaging or interfering with any of them. The air propelling apparatus mounted thereon is of "two types," one for inducing the flow of a comparatively large volume of air through the conveying pipes, and the other for supplying a volume of compressed air as hereinafter described. And as there are very many kinds of such blowers and compressors which might be used it is sufficient to state that the one at $a^4$ may be of a "fan-type" (such as that known of "The Sturtevant" make) while the other at $a^5$ may be of the reciprocating piston or rotary type for compressing the air. The fan $a^4$ is situated in a chamber $a^6$ adjoining the chamber $a'$ in which are mounted the rotary drums 8 and 9. The drum 8 is in the form of an open-ended cylinder, and preferably its surface consists of wire net work, or its equivalent, so that the current of air striking thereon will enter the said drum, but the solid matter will remain on the surface. The drum or roller 9 is preferably solid and acts as a pressure roll for the cotton passing over the drum 8, and a rotary movement is imparted thereto by frictional contact with said drum 8. To compensate for varying thickness of material passing between said drums 8 and 9, the axles of the latter are mounted in guides $9^a$ (see Fig. 7) so that the same may rise or fall. A shield 35 is mounted within the drum 8 to prevent the inrush of air at those parts where it would cause the cotton bat to adhere, and where it is necessary that such bat should be loose. Said shield 35 is connected by arms 36 to a hub 37 resting loosely on the drum's shaft and is held in position by means of a counterbalancing weight 38. A scraping knife 39 is mounted in the discharge opening at the rear of the casing, to assist in removing the cotton bat from the drum 8. The ends of the drum 8 as shown by Fig. 8 rotate within and open into the cavities or casings 10 which are connected with the chamber $a^6$ by the duct or pipe 11, so that as the fan $a^4$ is rotated to withdraw the air from the casing 10 said air travels through the drum 8 to keep up the flow through said casing 10. The drum 8 as also the fan $a^4$ is rotated by belt or other motion transmitting means actuated by the motor within the casing 12.

A stationary, and preferably inclined screen or grid 13 is located between the chamber $a^6$ and the drum 8, in a position where it will catch the foreign material falling from the cotton being delivered to said drum 8 as will presently appear.

Extending from the fan $a^4$ in the chamber $a^6$ is the chimney or uptake 14 through which air propelled by the fan $a^4$ ascends and escapes. This chimney 14 also answers the purposes of a stay or support for the horizontally extending pipes $f, f$ which are connected to it by the wire or like stays 15. The conveyer pipes $f, f$ are swiveled on bearings $a^2$ so that they may be brought from their folded positions shown in broken lines by Fig. 3 into their laterally extending positions shown by Figs. 1 and 2. Coupled to these pipes $f, f$ are the pendent flexible pipes or tubes $g, g$ arranged in positions lying between the rows of plants $c$. The delivery ends $f' f'$ of the conveyer pipes $f f$ are located in the chamber $a^6$ just above the screen or grid 13 so that the material delivered therefrom passes over said screen or grid 13 during its passage to the drum 8. In these tubes $g, g$ and at an appropriate distance from the mouth-pieces $h, h$ are mounted the valves $q, q$ actuated as hereinafter explained.

Leading from the compressed-air chamber $a^3$ are the tubes $m, m$ (shown in Figs. 6 and $6^a$) which are of comparatively small diameter and extend along the pipes $f, f$ and tubes $g, g$ up to the mouth pieces $h, h$ where they terminate in annular form around such mouth pieces in order that the air under pressure passing through them may escape through and be guided by outlet openings $p, p'$ of convenient shape to act upon the cotton and dislodge it from its pod or hull.

Situated in each tube $g$ is a valve $q$ which is actuated by the rod $r'$ (in the form of a toothed rack) of piston $r$ which works within the cylinder $s$, said piston $r$ being forced by compressed air in the upward or outward direction to move the toothed quadrant $r^2$ fixed to the spindle of the valve $q$ so as to cause said valve $q$ to open while the spring $r^3$ effects its closure when said compressed air is shut off.

Communicating with each of the tubes $m$ is a valve $t$ which is under the control of the attendant so that by the pressure of his thumb thereon it may be forced down against the recoil of the spring $t'$ to uncover or open a passage $t^2$ leading from the tube $m$. Through this opening $t^2$ the air under pressure enters the barrel of the valve $t$ (by passing through an opening made in the central part of said valve $t$) and escapes through an opening $u$ entering the cylinder $s$ to force the piston $r$ outwardly, thus opening the valve $q$. When the compressed air has thus forced the piston $r$ outwardly, the opening $u$ is uncovered and so said air may travel to escape by the outlet openings $p, p'$. Immediately the attendant releases his thumb pressure on the valve $t$ its spring effects its return and closes it thus allowing the spring $r^3$ to return the piston $r$ and close the valve $q$ so that all actions of the air through their respective extremities are shut off. An outlet opening $t^3$ allows any compressed air that may remain in the cylinder $s$ on the closing of the valve $t$, to escape.

The fan and air compressor on the vehicle are actuated by an engine or motor mechanism carried by said vehicle and such motor mechanism is also arranged to transmit motion where desired to parts which transport or carry same over the ground. Or if this is found undesirable then other means may be employed for carrying the vehicle and its apparatus into proper position relatively with the succeeding cotton plants, for performing the functions desired of them.

The operations of gathering the cotton are carried out by the vehicle being moved over the ground with the pipes $f, f$ extending laterally therefrom as shown by Figs. 1 and 2. Attendants are arranged each to take one or more tubes $g, g$ situated between his respective rows of plants $c$, one tube being held in one hand and another in the other hand (or where it is found that the handling of two tubes simultaneously is too laborious or intricate work for the attendant, then only one of such tubes may be used.) On the attendant approaching a plant for the purpose of gathering the cotton therefrom he places each of his mouth-pieces $h, h$ over a boll of cotton (one mouth piece over each boll separately) and presses the valve $t$ to open same and allow the compressed air to act thereon and this on account of being directed toward the base of the pod or hull containing the cotton, dislodges same so that it is brought under the influence of the suction of air by the fan which thus carries it along through the tubes $g$ and pipes $f$ to come into contact with the drums 8 and 9, which allow the air to pass through them as described, but by their rotary motions carry the cotton to pass between them to be thereby deposited in the receptacle 16. A guard 17 prevents the cotton and air from escaping by or passing over the top of the drum 8. Any seeds, husks or hulls or like matter which may travel with the cotton toward the drums 8 and 9 on passing over the grids or grating 13 are separated therefrom by frictional contact with said grating, on which they pass beneath so that they may subsequently be removed therefrom and employed for the many purposes for which they are useful. The finer dust escaping from the cotton through the drums 8 and 9 passes forward through the fan $a$ and up the chimney 14 to be carried away from the attendants and such dust in addition to the air, is the only substance which passes through the fan chamber $a^4$.

Such being the nature and object of my invention what I claim is:—

1. A cotton picking machine consisting of a suction chamber, suction tubes communicating therewith, a source of compressed air supply provided with outlets adapted to deliver compressed air into the mouths of said suction tubes, and mechanism operated by the compressed air for controlling the suction of said suction tubes.

2. A cotton picking machine consisting of a suction chamber, suction tubes communicating therewith, a source of compressed air supply provided with outlets adapted to deliver compressed air into the mouths of said suction tubes, a pressure operated valve controlling said suction pipe and a second valve controlling admission of pressure from said compressed air supply to operate the valve in said suction pipe.

3. A cotton picking machine consisting of a suction chamber, suction tubes communicating therewith, a source of compressed air supply provided with outlets adapted to deliver compressed air into the mouths of said suction tubes, a valve controlling each suction tube, a piston operated by pressure from said compressed air supply, a valve controlling the admission of pressure to said piston and connections between said piston and the valve in the suction tube.

4. A cotton picking machine consisting of a suction chamber, suction tubes communicating therewith, a source of compressed air supply provided with outlets adapted to deliver compressed air into the mouths of said suction tubes, a valve controlling each suction tube and provided with a toothed segment, a piston operated by pressure from said compressed air supply and provided with a rack engaging said segment and a valve controlling the admission of pressure to said piston.

5. A cotton picking machine comprising a suction chamber, suction tubes communicating therewith, a source of compressed air supply provided with outlets adapted to deliver compressed air into the mouths of said suction tubes, a pressure operated valve controlling each suction pipe, a spring pressed normally seated valve controlling admission of pressure to operate the first mentioned valve and a stem on said pressure controlling valve provided with an enlargement whereby the same may be manually operated.

6. A cotton picking machine consisting of a suction chamber, suction tubes communicating therewith, a source of compressed air supply, a manually operable valve for regulating the supply of compressed air, and mechanism controlled by said valve for controlling the action of the suction tubes.

7. A cotton picking machine consisting of a suction chamber, pivotally mounted suction tubes comunicating therewith and provided with depending branches, a source of compressed air supply provided with outlets adapted to deliver compressed air into the mouths of said suction tubes, and mechanism operated by the compressed air for controlling the suction of said suction tubes.

8. A cotton picking machine consisting of a suction chamber, suction tubes communicating therewith, a source of compressed air supply provided with outlets adapted to deliver compressed air into the mouths of said suction tubes, a valve controlling said compressed air supply, and means controlled by said valve for regulating the operation of said suction tubes.

9. A cotton harvester comprising a separating drum, swiveled pipes for delivering cotton upon the periphery of said drum, said pipes being provided with suction tubes, and a suction apparatus for exhausting air through the ends of said drum and simultaneously creating a suction in said pipes and tubes.

10. A cotton harvester comprising a separating drum, exhaust chambers with which the ends of said drum communicate, swiveled pipes for delivering cotton upon the periphery of said drum, said pipes being provided with suction tubes, and a suction apparatus for exhausting the air from said exhaust chambers and simultaneously creating a suction in said pipes and tubes.

11. A cotton harvester comprising a separating drum, suction tubes for delivering cotton upon the periphery of said drum, a suction apparatus for exhausting air through the ends of said drum, a stack into which said suction apparatus delivers the exhausted air, and means carried by said stack for supporting said suction tubes, In testimony whereof I have hereunto affixed my signature in presence of two witnesses.

FREDERIC PRESTWICH.

Witnesses:
 John Whitehead,
 Daniel Walsh Howarth.